Figure 1:
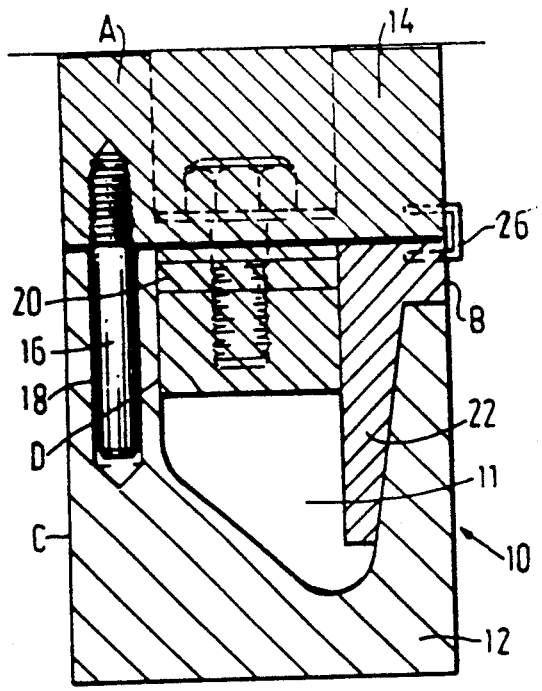

United States Patent [19]

Crompton

[11] Patent Number: 5,082,494
[45] Date of Patent: Jan. 21, 1992

[54] MATERIALS FOR AND MANUFACTURE OF FIRE AND HEAT RESISTANT COMPONENTS

[75] Inventor: Geoffrey Crompton, Southport, England

[73] Assignee: Crompton Design Manufacturing Limited, Southport, England

[21] Appl. No.: 280,019

[22] Filed: Dec. 5, 1988

[30] Foreign Application Priority Data

Dec. 16, 1987 [GB] United Kingdom ............... 8729303

[51] Int. Cl.⁵ .................................... C09D 5/16
[52] U.S. Cl. ................................ 106/18.12; 106/38.3; 106/600; 106/601; 106/602; 106/605; 106/626; 106/628; 106/632; 428/494
[58] Field of Search .................. 106/74, 75, 18.12, 84, 106/38.3; 428/494

[56] References Cited

U.S. PATENT DOCUMENTS

| | | | |
|---|---|---|---|
| Re. 31,428 | 10/1983 | Pedlow | 428/215 |
| Re. 32,131 | 4/1986 | Stahl | 428/215 |
| 2,284,400 | 5/1942 | Llewellyn et al. | 106/75 |
| 4,189,619 | 2/1980 | Pedlow | 174/48 |
| 4,273,821 | 6/1981 | Pedlow | 428/215 |
| 4,784,902 | 11/1988 | Crompton | 428/283 |
| 4,879,066 | 11/1989 | Crompton | 252/606 |

FOREIGN PATENT DOCUMENTS 55-1189980 9/1980 Japan .

OTHER PUBLICATIONS

Chemical Abstracts, vol. 94, 1981, 94:32362B.

Primary Examiner—William R. Dixon, Jr.
Assistant Examiner—Alan Wright
Attorney, Agent, or Firm—Leydig, Voit & Mayer

[57] ABSTRACT

A composition for use in manufacturing fire and heat resistant components, typically by moulding, comprises a mixture of foamed filler, a liquid binder and one or more frits. The composition may itself be moulded to form such components or may be included in other moulding systems to impart fire and heat resistant properties to a moulding.

16 Claims, 1 Drawing Sheet

MATERIALS FOR AND MANUFACTURE OF FIRE AND HEAT RESISTANT COMPONENTS

This invention concerns materials for and the manufacture of fire and heat resistant components.

Examples of such components includes fire door covers, complete fire doors and glazing beads that hold glass in place in such doors; partitions and storage walls; collars between pipes and support brackets; furnishings, ceilings, wall claddings associated with underground stations, escalators and tunnels; interior fitments of trains; cabin walls, ceilings, floors, doors, port hole surrounds and furniture, that needs to comply with Solas requirements in the marine field; bulk heads, storage boxes and lids, fire barriers in aircraft, aerospace vehicles and automotive vehicles; and internal modular walls, ceilings, floors and platform floors, cable ducting, external cladding panels, roofing and window frames in the building industry. Indeed components for any application where the requirement is for low smoke, toxic fume, and fire stable flat board or moulded three dimensional forms are envisaged.

Existing boards made from Mica, Gypsum and the like are in general fragile, require finishing and are heavy. Three dimensional mouldings, castings, or decorative laminates are generally made with phenolic resin as the liquid carrier, cured by acid catalyst or heat or both. These components have low smoke and toxic fume properties and are preferred to similar components made from polyester, urethane methacrylate or epoxy thermosetting resins, there being no thermoplastic resins suitable for these uses by definition.

The phenolic resin burns away at temperature around 450 degrees C. leaving a substrate which is usually fragile. U.K. Patent Application No. 2182607A concerns methods of strengthening the substrate.

An object of this invention is to provide an alternative material for the manufacture of fire and heat resistant components.

Another object of this invention is to provide a method of manufacturing fire and heat resistant components.

According to the invention a material for the manufacture of fire and heat resistant components comprises a mixture of foamed filler, a liquid binder and one or more frits.

Foamed materials suitable for use in the invention include kaolin, borate and foamed glass. Particularly suitable is kaolin clay foamed or in prill form such as described in U.K. Patent No. 2067174. Suitable foamed glass is foamed glass spheres, such as made from waste glass. Foamed glass spheres may have the advantage of being less damaging to mixer blades than some other foamed materials.

The liquid binder may be a resin, such as phenolic resin, but the preferred liquid binder is an adhesive such as sodium silicate.

The material of the invention may comprise one or more frits in powder, gel or liquid form. Preferred is a frit of low melt temperature, softening around 300 degrees C. to 500 degrees C. flowing around 400 degrees C. to 600 degrees C. which triggers off the melt and flow action of a second frit having a higher melt temperature and so on. A devitrifying frit can be used as one in the chain, usually to act around 600 degrees C. to 800 degrees C., this frit melting and setting hard rather than continuing to flow.

The use of milled or ground ceramic fibre, typically $Al_2O_3$ 47.0%, $SiO_2$ 52.8%, $Na_2O$ 0.1%, $Fe_2O_3$ 0.04%, of high temperature resistance as a matrix for the frit is recommended in some cases although a similar effect can be obtained by careful choice of refractory frit or other material such as alumina silicate, possibly in anhydrous form. Vermiculite in fine to coarse form can be used to promote intumesence in an end product.

Alumina trihydrate or hydrated magnesium calcium carbonate can also be incorporated in materials of the invention and the hemispherical glass balls produced as slag from power stations or foamed glass spheres, such as made from waste glass may be used as an extender and heat stable matrix, particularly in the casting or sintering material.

A borate, such as calcium metaborate, may be advantageously incorporated in the materials of the invention particularly those based on sodium silicate. The borate reacts with sodium silicate particularly upon heating to form calcium silicate which is immiscible with water and so prevents dissolving of sodium silicate from components made from materials of the invention that are subjected to water.

The materials of the invention may be formed by mixing the foamed filler with the liquid binder such as sodium silicate that contains the frit or frit and other optional ingredients. A typical formulation for the liquid binder would be sodium silicate four parts and one part low melt frit or flux, one part medium melt frit, one part high melt frit, one part ceramic binder. Another typical formulation would be sodium silicate six parts, one part low melt frit or flux and one part devitrifing refractory frit or anhydrous aluminium silicate, or any proportion or combination of frits and sodium silicate with or without one or any of alumina trihydrate, ceramic fibre or aluminium silicate.

The invention further comprehends components made from materials according to the invention and methods of making same.

The prills are typically mixed with the sodium silicate/frit adhesive in sufficient quantity to wet the surface and to bind the mix together when under pressure. Typically one part adhesive, one part foamed clay, one part frits.

The materials of the invention are primarily intended for moulding or casting to produce components. Preferred moulds or, in the case of boards or sheet, platterns are made of steel and in some cases coated with a release agent such as polytetrafluoroethylene. It is an advantage although not a necessity to have the facility to heat the moulds or platterns. The material of the invention may be trowelled, applied by foundry sand casting equipment or sprayed evenly on the surface of a female mould and the male mould is closed. The material is then compressed by a predetermined amount depending on the density of the component required. The pressure and, if present, heat, semicures the compacted moulding and it is possible to eject it from the open mould onto a drying surface. The mould should preferably be designed to allow a male form to penetrate the female mould by a predetermined amount, thus allowing the mould to be filled to the brim with the uncompacted material which is then compressed as the tool is closed under pressure. (The same material mix can also be used to fill the cavity between two rigid membranes, without pressure, to act as a lightweight insulating medium, cured over a period of time at ambient temperature or accelerated by heat or catalyst.)

A moulding is typically heated to effect a final cure for about 12 hours at about 80 degrees C. and the for about 60 mins at about 120 degrees C. for one component, for about 60 mins at about 120 degrees C. in matched moulds for another, flash heating to cure the surface within seconds and then storage for some days at ambient temperature for another. Microwave curing and storage at ambient temperature has also proved effective. The use of a catalyst in strictly controlled quantities can accelerate the curing time.

The component thus formed and cured can then be painted using the paint described in U.K. Patent Application No. 2188643A or can be vitreous enamelled using a pottery glaze technique. A work piece can be heated gently to fuse the glaze and allowed to cool slowly. The resultant finish is smooth, inert, non toxic, easily cleaned and may be in whatever colour or combination of colours is required. In some cases an undercoat is considered an advantage and so the vitrifying process may be carried out twice.

The preferred inclusion of low melting frit in the material of the invention means that as the work piece progresses through the enamelling cycle a honeycomb of melted and subsequently solidified frit is formed around the foamed filler or prill, giving a lightweight highly insulating, strong component. A sheet of this material has been tested to 2500 degrees C. on one side of a 30 mm board and has retained integrity and insulation. A 25 mm board has been tested to 1000 degrees C. for 90 mins to BS 476 Part 8 (indicative) and exhibited no spread of flame, no smoke, no toxic fume, no loss of integrity and was within insulation requirements.

Replacing sodium silicate with phenolic resin in materials of the invention can be similarly effective. The phenolic resin burns away at 450 degrees C. but the char which is left combines with the frit element of the material and the filler or prills on the front face of the board, or moulding, to protect the remainder of the thickness. If phenolic resin is to be used then the addition of alumina trihydrate to emit water vapour at lower temperatures and of aluminium silicate to do the same in the 600 degrees C. range is advantageous.

A mix of 10% by weight prill 40% by weight phenolic resin/catalyst 15% by weight alumina trihydrate or hydrated magnesium calcium carbonate, 5% by weight aluminium silicate, 15% by weight, low melt flux and 15% by weight devitrifying frit has produced a strong lightweight moulding, although many other combinations can be used to give different effects.

A very low melt flux or frit may be used to coat phenolic mouldings in the same way as the sodium silicate material. For such a case a typical formulation will be 10% by weight filler or prill, 40% by weight phenolic resin/catalyst, 25% by weight frit to melt and flow at 600 degrees C. to 700 degrees C. and 25% by weight devitrifying frit which acts 700 degrees C. By varying the percentages according to the viscosity of the phenolic resin a dough moulding compound may be produced.

Examples of suitable frit/other ingredient mixes incorporated in the liquid binder are as follows (percentages by weight):

(1) 60% alumina trihydrate, 5% soft frit, 20% hard frit and 15% ceramic fibre (2) 30% soft frit, 30% hard frit, 30% medium frit, 10% antimony oxide, (3) 40% alumina trihydrate, 16.7% low frit, 16.7% medium frit, 16.7% high frit, 10% antomony oxide (4) 25% soft frit, 25% medium frit, 25% high frit, 25% ceramic fibre;

(5) 25% soft frit, 25% medium frit, 25% high frit, 25% aluminium silicate, (6) 5% soft frit, 25% medium frit, 35% devitrifying high frit 35% vermiculite.

Foamed clay has been successfully added to these mixes with both sodium silicate and phenolic binders.

The proportion by weight of sodium silicate to other components can vary from 95% to 5% and 5% to 95%. The proportion by weight of phenolic resin in liquid or powder forms can vary from 95% to 5% and 5% to 95%.

The proportion by weight of soft flux can vary from a tiny proportion to 100% of the frit content when used with sodium silicate or phenolic resin.

The proportion by weight of foamed clay can vary from a small proportion in a structural component to a majority in an uncompressed insulation infill between rigid membranes, or used in free form insulation.

The inclusion of varying amounts of chopped glass strand of various lengths may increase the strength of mouldings material of the invention as may the inclusion of phenolic resin in liquid or powder form.

A typical formulation would be 25% by weight of unmodified phenol/formaldehyde solid novolak, fine ground with hexamine, 25% by weight of mixed frits, 30% by weight of sodium silicate 5% by weight of chopped glass and 15% by weight of kaolin prill or foamed glass spheres, preferably up to 3 mm, especially from 2 to 3 mm in diameter.

A method of producing a structural partition suitable for use in office, shop and the marine field is to use a plywood construction on either side of a wooden support frame. This construction can be made to pass BS 476 Part 8 and Solas 60 by the use of the foamed clay, frit and sodium silicate mixtures of the invention.

The mix is used as an infill material, uncompressed or in some cases compressed, and then as a coating on the outer faces. This layer can be sprayed on and cured or applied and compressed by plattern or heated plattern, particular care being taken to cover the edges of the ply construction. The platterns can be lined with the finishing laminate and the pressure and heat, if present, used to adhere that laminate to the mix. A pre-coat of the adhesive, frit and sodium silicate mix can be used, if necessary.

Another suitable finishing material may be powdered kaolin on glass cloth impregnated with resin, say phenolic resin, that contains one or more frits and optionally other suitable ingredients that may enhance no flame or no fume properties.

Figure 2:
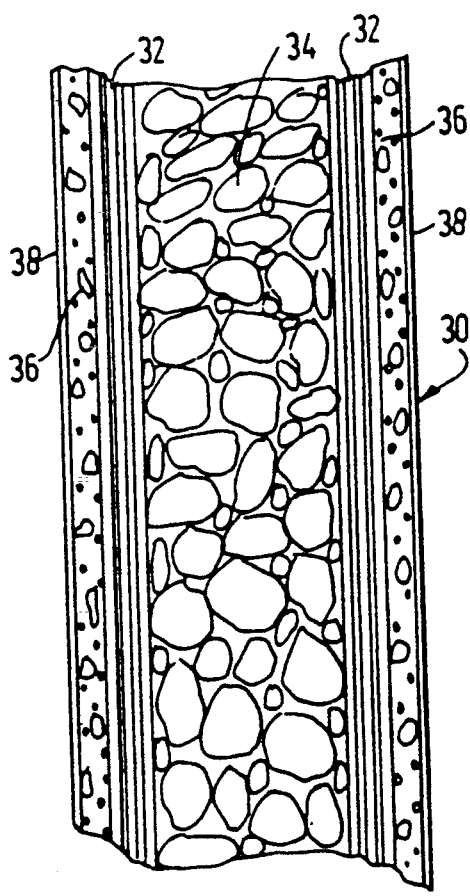

This invention will now be further described, by way of example only, with reference to the accompanying drawings, in which:

FIG. 1 is a section through a mould for a typical component of the invention; and FIG. 2 is a section through a laminate incorporating material of the invention.

Referring to FIG. 1 of the drawings, a mould 10 of steel for forming a glazing bead 11 comprises a female part 12 being internally shaped to the outer shape of the glazing bead and a male part 14 locatable on the female part 12 by means of locating pins 16 in corresponding bores 18.

The depth to which the male part 14 enters the female part may be adjusted by means of packing rings 20. The male part 14 also has a separable part 22 that forms an undercut of the glazing bead. The part 22 is inserted into the female mould part prior to pouring in the mouldable material but is connectable to the main male part 14 by means of a pin 26 for removal together.

After curing and removal of the male mould part 14 the moulded component is removed by inversion of the female mould part possibly assisted by ejectors operating through the wall of the female mould part 12.

Turning to FIG. 2, a board or panel 30 comprises facing sheets of plywood 32 separated by an open frame also of plywood. Between the sheets of plywood is an uncompacted mixture 34 of kaolin prills or foamed glass spheres 3 parts, sodium silicate 2 parts and frits 1 part. On each outer plywood surfaces is a layer 36 of compressed kaolin prill or foamed glass spheres/sodium silicate/frits mix and on that is a sheet 38 of phenolic resin impregnated ceramic paper with frits or phenolic resin impregnated glass cloth with kaolin powder.

Clearly the mixtures of the invention may be used in many other ways and combination to produce a variety of components all with good fire and smoke resistant properties.

I claim:

1. A method for the manufacture of fire and heat resistant molded components from a composition comprising a liquid binder and a foamed filler, said method comprising adding to said composition additives comprising a first frit having a relatively low melting point and at least one other frit having a melting point higher than said first frit, said frits being capable of melting progressively in the range from 300 to 800 degrees C.

2. The method as claimed in claim 1, wherein the foamed filler is selected from kaolin, and foamed glass.

3. The method as claimed in claim 2, wherein the kaolin is in prill form.

4. The method as claimed in claim 1, wherein the liquid binder is selected from phenolic resin and sodium silicate.

5. The method as claimed in claim 4, wherein the liquid binder comprises from 5 to 95% of the total composition.

6. A composition as claimed in claim 1, wherein at least one of said other frit is a devitrifying frit.

7. The method as claimed in claim 1, wherein said composition further comprises a member selected from the group consisting of milled and ground ceramic fiber.

8. The method as claimed in claim 1, wherein said composition further comprises vermiculite.

9. The method as claimed in claim 1, wherein said composition further comprises a member selected from the group consisting of alumina trihydrate and hydrated magnesium calcium carbonate.

10. The method as claimed in claim 1, wherein said composition further comprises an extender selected from the group consisting of foamed glass spheres and glass balls.

11. The method as claimed in claim 1, wherein said composition further comprises a borate.

12. The method as claimed in claim 11, wherein the borate is calcium borate.

13. The method as claimed in claim 1, wherein said composition further comprises foamed clay.

14. The method as claimed in claim 1, wherein said composition further comprises chopped glass strands.

15. The method as claimed in claim 1, wherein said composition comprises 10% by weight of kaolin prills, 40% by weight of phenolic resin/catalyst, 15% by weight of a member selected from the group consisting of alumina trihydrate and hydrated magnesium calcium carbonate, and 5% by weight of aluminum silicate, said method comprising adding to said composition 15% by weight of low melt frit and 15% by weight of devitrifying frit.

16. The method as claimed in claim 1, wherein said composition comprises 10% by weight of foamed or prill filler, and 40% by weight of phenolic resin/catalyst, said method comprising adding to said composition 25% by weight of a first frit to melt and flow at 600 to 700 degrees C. and 25% by weight of devitrifying frit which acts at 700 degrees C.

* * * * *

UNITED STATES PATENT AND TRADEMARK OFFICE
CERTIFICATE OF CORRECTION

PATENT NO. : 5,082,494
DATED : January 21, 1992
INVENTOR(S) : GEOFFREY CROMPTON

It is certified that error appears in the above-identified patent and that said Letters Patent is hereby corrected as shown below:

Claim 6, col. 6, line 24, "A composition" should be -- The method --.

Signed and Sealed this

Fourth Day of May, 1993

Attest:

MICHAEL K. KIRK

Attesting Officer

Acting Commissioner of Patents and Trademarks